US012598683B1

(12) United States Patent
Hsu

(10) Patent No.: US 12,598,683 B1
(45) Date of Patent: Apr. 7, 2026

(54) LIGHT EMITTING DEVICE

(71) Applicant: ASMedia Technology Inc., New Taipei City (TW)

(72) Inventor: Chun-Jung Hsu, New Taipei City (TW)

(73) Assignee: ASMedia Technology Inc., New Taipei City (TW)

( * ) Notice: Subject to any disclaimer, the term of this patent is extended or adjusted under 35 U.S.C. 154(b) by 0 days.

(21) Appl. No.: 19/056,600

(22) Filed: Feb. 18, 2025

(30) Foreign Application Priority Data

Jan. 22, 2025 (TW) ................................ 114102877

(51) Int. Cl.

| | |
|---|---|
| ***H05B 45/34*** | (2020.01) |
| ***F21V 23/00*** | (2015.01) |
| ***F21Y 103/10*** | (2016.01) |
| ***F21Y 115/10*** | (2016.01) |
| ***H05B 45/44*** | (2020.01) |
| ***H05B 47/165*** | (2020.01) |

(52) U.S. Cl.
CPC ........... *H05B 45/34* (2020.01); *F21V 23/001* (2013.01); *F21V 23/003* (2013.01); *H05B 45/44* (2020.01); *H05B 47/165* (2020.01); *F21Y 2103/10* (2016.08); *F21Y 2115/10* (2016.08)

(58) Field of Classification Search
CPC ...... H05B 45/34; H05B 45/44; H05B 47/165; F21V 23/001; F21V 23/003
See application file for complete search history.

(56) References Cited

U.S. PATENT DOCUMENTS

| | | | | |
|---|---|---|---|---|
| 6,528,954 | B1 * | 3/2003 | Lys | H05B 45/46 315/158 |
| 2017/0094746 | A1 * | 3/2017 | Xiong | H05B 45/48 |
| 2018/0139824 | A1 * | 5/2018 | Lin | F21V 23/001 |
| 2018/0220502 | A1 * | 8/2018 | Morales | H05B 45/48 |
| 2019/0186723 | A1 * | 6/2019 | Xie | H05B 45/42 |
| 2019/0230758 | A1 * | 7/2019 | Wang | H05B 45/38 |
| 2023/0109205 | A1 * | 4/2023 | Xiong | F21V 25/04 315/127 |
| 2023/0201738 | A1 * | 6/2023 | Choi, II | A63J 5/02 |
| 2025/0089135 | A1 * | 3/2025 | Yang | H05B 47/185 |

FOREIGN PATENT DOCUMENTS

| | | |
|---|---|---|
| CN | 114746927 A | 7/2022 |
| TW | 202501522 A | 1/2025 |

OTHER PUBLICATIONS

"Office Action of Taiwan counterpart Application", issued on Dec. 2, 2025, p. 1-p. 6.

* cited by examiner

*Primary Examiner* — Bryon T Gyllstrom
(74) *Attorney, Agent, or Firm* — JCIPRNET

(57) ABSTRACT

Provided is a light emitting device. The light emitting device includes a control circuit and a light emitting element string. The control circuit outputs a driving power. The light emitting element string includes light emitting elements, a power line, a first receiving port, and a second receiving port. The power line is connected to the light emitting elements. A first terminal of the power line is connected to a first-stage light emitting element. The second terminal of the power line is connected to a last-stage light emitting element. The first receiving port provides the driving power to the first terminal of the power line. The second receiving port provides the driving power to the second terminal of the power line.

10 Claims, 5 Drawing Sheets

LIGHT EMITTING DEVICE

CROSS-REFERENCE TO RELATED APPLICATION

This application claims the priority benefit of Taiwan application serial no. 114102877, filed on Jan. 22, 2025. The entirety of the above-mentioned patent application is hereby incorporated by reference herein and made a part of this specification.

BACKGROUND

Technical Field

This disclosure relates to an electronic device, and particularly relates to a light emitting device.

Description of Related Art

A light emitting device may include a light emitting element string. The light emitting element string includes a power line. Multiple light emitting elements in the light emitting element string may be driven by a driving power transmitted via the power line. Generally, a single receiving terminal of the power line receives the driving power. It should be noted that if the light emitting element string is a light strip or light tube composed of dozens or hundreds of light emitting elements, the path length of the power line will be very long. The voltage value at the end of the power line will be significantly lower than the voltage value at the receiving terminal of the power line. The low voltage value at the end of the power line causes the light emitting elements at the end of the light emitting element string to be unable to accurately execute the expected light emitting effect. Therefore, the operation of the light emitting element string may become abnormal.

Therefore, how to provide a method to make the voltage value at the end of the power line of the light emitting element string resemble the voltage value at the receiving terminal of the power line is one of the research focuses for those skilled in the art.

SUMMARY

The disclosure provides a light emitting device, capable of making voltage values at both ends of a power line of a light emitting element string consistent.

In an embodiment of the disclosure, a light emitting device includes a control circuit and a light emitting element string. The control circuit outputs a driving power. The light emitting element string includes multiple light emitting elements, a power line, a first receiving port, and a second receiving port. The multiple light emitting elements include a first-stage light emitting element located at a first terminal of the light emitting element string and a last-stage light emitting element located at a second terminal of the light emitting element string. The power line is connected to the multiple light emitting elements. A first terminal of the power line is connected to the first-stage light emitting element. A second terminal of the power line is connected to the last-stage light emitting element. The first receiving port is connected to the control circuit, the first-stage light emitting element, and the first terminal of the power line. The first receiving port provides the driving power to the first terminal of the power line. The second receiving port is connected to the control circuit, the last-stage light emitting element, and the second terminal of the power line. The second receiving port provides the driving power to the second terminal of the power line.

Based on the above, the first receiving port provides the driving power to the first terminal of the power line. The second receiving port provides the driving power to the second terminal of the power line. In other words, both ends of the power line of the light emitting element string receive the same driving power. Therefore, the voltage values at both ends of the power line of the light emitting element string are consistent. As a result, the last-stage light emitting element can accurately execute the expected light emitting effect.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
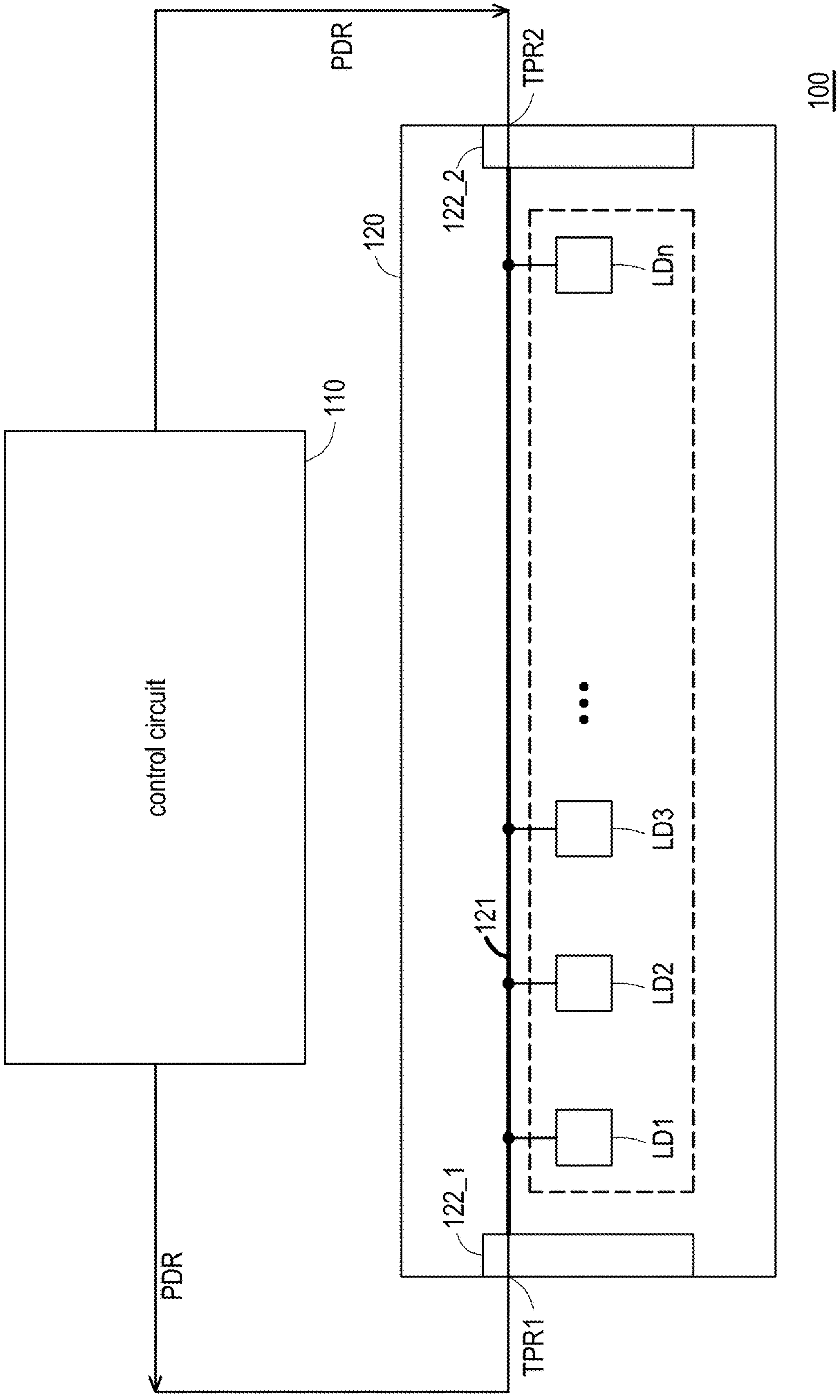
FIG. 1 is a schematic diagram illustrating a light emitting device according to an embodiment of the disclosure.

Some embodiments of the disclosure will be described in detail with reference to the accompanying drawings. In the following description, when the same reference numerals appear in different drawings, they will be regarded as the same or similar elements. These embodiments are only a part of the disclosure and do not disclose all possible implementations of the disclosure. More precisely, these embodiments are only examples within the scope of the claims of the disclosure.

FIG. 1 is a schematic diagram illustrating a light emitting device according to an embodiment of the disclosure. In this embodiment, a light emitting device 100 includes a control circuit 110 and a light emitting element string 120. The control circuit 110 outputs a driving power PDR. The light emitting element string 120 includes light emitting elements LD1 to LDn, a power line 121, and receiving ports 122_1, 122_2. The light emitting elements LD1 to LDn are arranged sequentially between the receiving port 122_1 and the receiving port 122_2. Therefore, the light emitting element string 120 may be, for example, a light strip or a light tube. Among the light emitting elements LD1 to LDn, the light emitting element LD1 is the first-stage light emitting element located at the first terminal of the light emitting element string 120. The light emitting element LDn is the last-stage light emitting element located at the second terminal of the light emitting element string 120.

In this embodiment, the power line 121 is connected to the light emitting elements LD1 to LDn. The first terminal of the power line 121 is connected to the light emitting element LD1 (i.e., the first-stage light emitting element). The second terminal of the power line 121 is connected to the light emitting element LDn (i.e., the last-stage light emitting element).

In this embodiment, the receiving port 122_1 is connected to the control circuit 110, the light emitting element LD1, and the first terminal of the power line 121. The receiving port 122_1 provides the driving power PDR to the first terminal of the power line 121. The receiving port 122_2 is connected to the control circuit 110, the light emitting element LDn, and the second terminal of the power line 121. The receiving port 122_2 provides the driving power PDR to the second terminal of the power line 121.

It is worth mentioning here that the receiving port 122_1 provides the driving power PDR to the first terminal of the power line 121. The receiving port 122_2 provides the driving power PDR to the second terminal of the power line 121. In other words, both terminals of the power line 121 receive the same driving power PDR. Therefore, the voltage values at both terminals of the power line 121 are approximately consistent. The voltage value of the driving power PDR received by the light emitting element far from the first terminal of the power line 121 may not significantly decrease. As a result, all the light emitting elements LD1 to LDn can accurately execute the expected light emitting effect based on the same voltage value of the driving power PDR.

In this embodiment, the light emitting elements LD1 to LDn may each be implemented by any type of light emitting diode (LED) circuit. In this embodiment, the power line 121 may be a conductive structure used for transmitting the driving power PDR. The power line 121 may be a power rail. In this embodiment, the receiving port 122_1 receives the driving power PDR through a power receiving terminal TPR1. The receiving port 122_2 receives the driving power PDR through a power receiving terminal TPR2.

Figure 2:
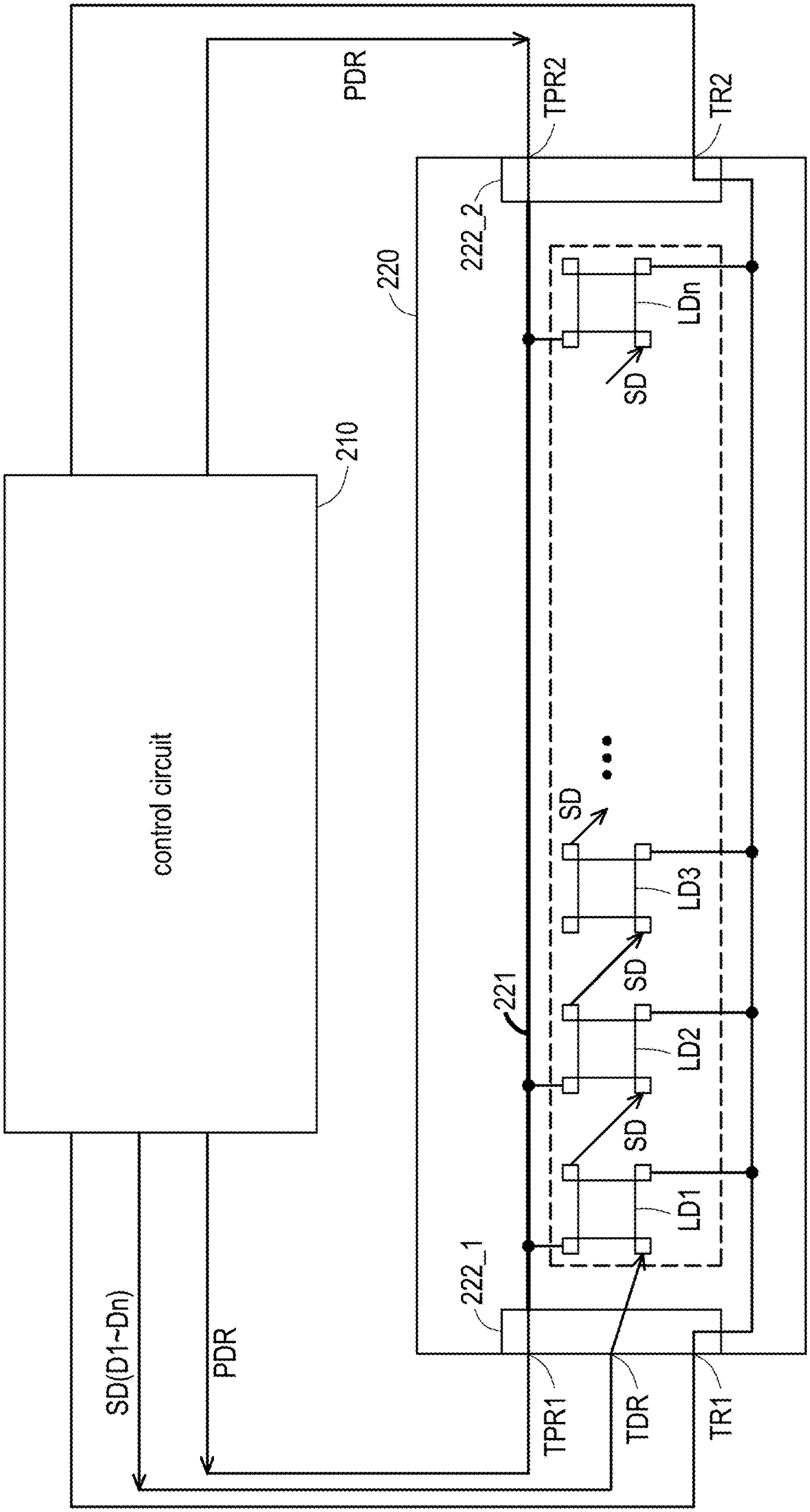
FIG. 2 is a schematic diagram illustrating a light emitting device according to an embodiment of the disclosure.

FIG. 2 is a schematic diagram illustrating a light emitting device according to an embodiment of the disclosure. In this embodiment, a light emitting device 200 includes a control circuit 210 and a light emitting element string 220. The control circuit 210 outputs a driving power PDR. The light emitting element string 220 includes light emitting elements LD1 to LDn, a power line 221, and receiving ports 222_1, 222_2. The power line 221 is connected to the light emitting elements LD1 to LDn. The receiving port 222_1 includes a power receiving terminal TPR1 and a data receiving terminal TDR. The power receiving terminal TPR1 is connected to the first terminal of the power line 221. The power receiving terminal TPR1 receives the driving power PDR and transmits the driving power PDR to the first terminal of the power line 221. The data receiving terminal TDR is connected to the light emitting element LD1 (i.e., the first-stage light emitting element). The data receiving terminal TDR receives a data string SD and transmits the data string SD to the light emitting element LD1.

In this embodiment, the data string SD is a sequence signal including data D1 to Dn. The light emitting elements LD1 to LDn include controllers and light emitting units. The controller of the light emitting element LD1 receives the data D1 from the data string SD and transmits the data string SD to the light emitting element LD2 (i.e., the second-stage light emitting element). The controller of the light emitting element LD2 receives the data D2 from the data string SD and transmits the data string SD to the light emitting element LD3 (i.e., the third-stage light emitting element), and so on. The controller of the light emitting element LD1 may control the light emitting method of the light emitting unit of the light emitting element LD1 based on the data D1. The controller of the light emitting element LD2 may control the light emitting method of the light emitting unit of the light emitting element LD2 based on the data D2, and so on.

In this embodiment, the receiving port 222_2 includes a power receiving terminal TPR2. The power receiving terminal TPR2 is connected to the second terminal of the power line 221. The power receiving terminal TPR2 receives the driving power PDR and transmits the driving power PDR to the second terminal of the power line 221.

Moreover, the receiving port 222_1 also includes a reference terminal TR1. The receiving port 222_2 also includes a reference terminal TR2. The reference terminals TR1, TR2 are commonly connected with the reference terminals of the light emitting elements LD1 to LDn to a reference low voltage (for example, ground) in the control circuit 210.

In this embodiment, the receiving ports 222_1, 222_2 may be respectively implemented by connectors known to those skilled in the art.

Figure 3:
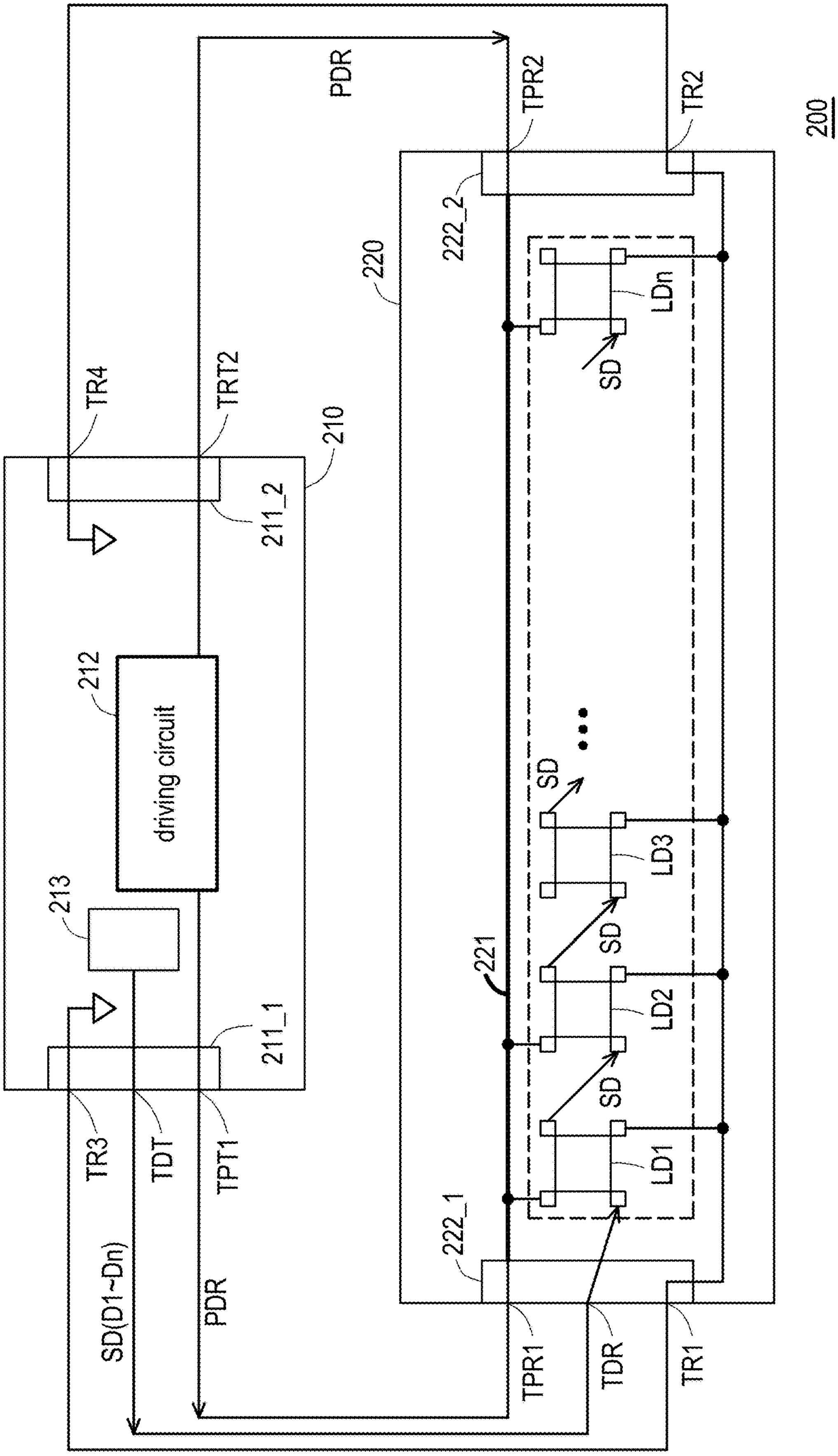
FIG. 3 is a schematic diagram illustrating a light emitting device according to an embodiment of the disclosure.

FIG. 3 is a schematic diagram illustrating a light emitting device according to an embodiment of the disclosure. In this embodiment, the control circuit 210 includes transmitting ports 211_1, 211_2 and a driving circuit 212. The transmitting port 211_1 may be operated to connect to the receiving port 222_1. The transmitting port 211_2 may be operated to connect to the receiving port 222_2. The driving circuit 212 is connected to the transmitting ports 211_1, 211_2. The driving circuit 212 generates the driving power PDR and provides the driving power PDR to the transmitting ports 211_1, 211_2. The driving power PDR is provided to the first terminal of the power line 221 through the transmitting port 211_1 and the receiving port 222_1. Moreover, the driving power PDR is also provided to the second terminal of the power line 221 through the transmitting port 211_2 and the receiving port 222_2.

The control circuit 210 also includes a data generator 213. The data generator 213 is connected to the transmitting port 211_1. The data generator 213 generates the data string SD and provides the data string SD to the transmitting port 211_1. The data string SD is provided to the light emitting element LD1 through the transmitting port 211_1 and the receiving port 222_1.

In this embodiment, the transmitting port 211_1 includes a power transmitting terminal TPT1 and a data transmitting terminal TDT. The power transmitting terminal TPT1 is connected to the driving circuit 212. The data transmitting terminal TDT is connected to the data generator 213. When the transmitting port 211_1 is connected to the receiving port 222_1, the power transmitting terminal TPT1 is connected to the power receiving terminal TPR1. The data transmitting terminal TDT is connected to the data receiving terminal TDR. Therefore, the driving power PDR is provided to the first terminal of the power line 221 through the power transmitting terminal TPT1 and the power receiving terminal TPR1. The data string SD is provided to the light emitting element LD1 through the data transmitting terminal TDT and the data receiving terminal TDR.

In this embodiment, the transmitting port 211_2 includes a power transmitting terminal TPT2. The power transmitting terminal TPT2 is connected to the driving circuit 212. When the transmitting port 211_2 is connected to the receiving port 222_2, the power transmitting terminal TPT2 is connected to the power receiving terminal TPR2. Therefore, the driving power PDR is provided to the second terminal of the power line 221 through the power transmitting terminal TPT2 and the power receiving terminal TPR2.

Moreover, the transmitting port 211_1 also includes a reference terminal TR3. The transmitting port 211_2 also includes a reference terminal TR4. When the transmitting port 211_1 is connected to the receiving port 222_1 and the transmitting port 211_2 is connected to the receiving port 222_2, the reference terminals TR1, TR2 and the reference terminals of the light emitting elements LD1 to LDn are commonly connected to the reference low voltage in the control circuit 210 through the reference terminals TR3, TR4.

In this embodiment, the transmitting ports 211_1, 211_2 may be respectively implemented by connectors known to those skilled in the technical field.

Figure 4:
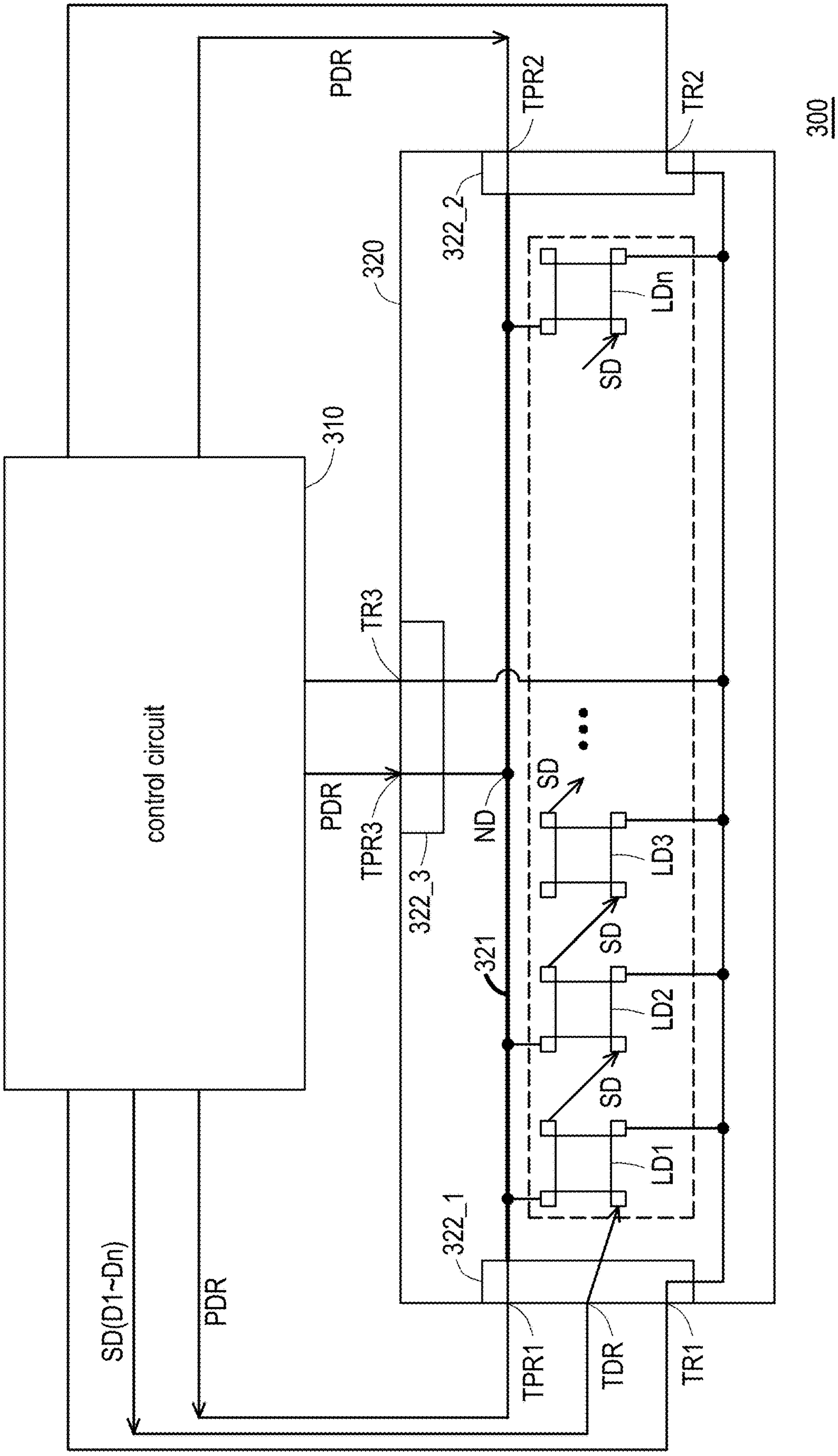
FIG. 4 is a schematic diagram illustrating a light emitting device according to an embodiment of the disclosure.

FIG. 4 is a schematic diagram illustrating a light emitting device according to an embodiment of the disclosure. In this embodiment, a light emitting device 300 includes a control circuit 310 and a light emitting element string 320. The control circuit 310 outputs a driving power PDR. The light emitting element string 320 includes light emitting elements LD1 to LDn, a power line 321, and receiving ports 322_1 to 322_2. The power line 321 is connected to the light emitting elements LD1 to LDn. The receiving port 322_1 includes a power receiving terminal TPR1 and a data receiving terminal TDR. The power receiving terminal TPR1 is connected to the first terminal of the power line 321. The power receiving terminal TPR1 receives the driving power PDR and transmits the driving power PDR to the first terminal of the power line 321. The data receiving terminal TDR is connected to a light emitting element LD1. The data receiving terminal TDR receives a data string SD and transmits the data string SD to the light emitting element LD1.

Similar to the embodiment in FIG. 2, the data string SD is a sequence signal including data D1 to Dn. The light emitting element LD1 receives the data D1 in the data string SD and transmits the data string SD to the light emitting element LD2. The light emitting element LD2 receives the data D2 in the data string SD and transmits the data string SD to the light emitting element LD3, and so on.

In this embodiment, the receiving port 322_2 includes a power receiving terminal TPR2. The power receiving terminal TPR2 is connected to the second terminal of the power line 321. The power receiving terminal TPR2 receives the driving power PDR and transmits the driving power PDR to the second terminal of the power line 321.

In this embodiment, a receiving port 322_3 is connected to the control circuit 310 and the power line 321. The receiving port 322_3 provides the driving power PDR to a node ND of the power line 321. The node ND of the power line 321 is located between the first terminal and the second terminal of the power line 321. Therefore, the voltage values at both ends of the power line 121 and at the node ND are substantially consistent.

In this embodiment, the receiving port 322_3 includes a power receiving terminal TPR3. The power receiving terminal TPR3 is connected to the node of the power line 321. The power receiving terminal TPR3 receives the driving power PDR and transmits the driving power PDR to the node ND of the power line 321.

Moreover, the receiving port 322_1 also includes a reference terminal TR1. The receiving port 322_2 also includes a reference terminal TR2. The receiving port 322_3 also includes a reference terminal TR3. The reference terminals TR1 to TR3 and the reference terminals of the light emitting elements LD1 to LDn are commonly connected to a reference low voltage.

In this embodiment, the receiving ports 322_1 to 322_3 may be respectively implemented by connectors known to those skilled in the technical field.

Figure 5:
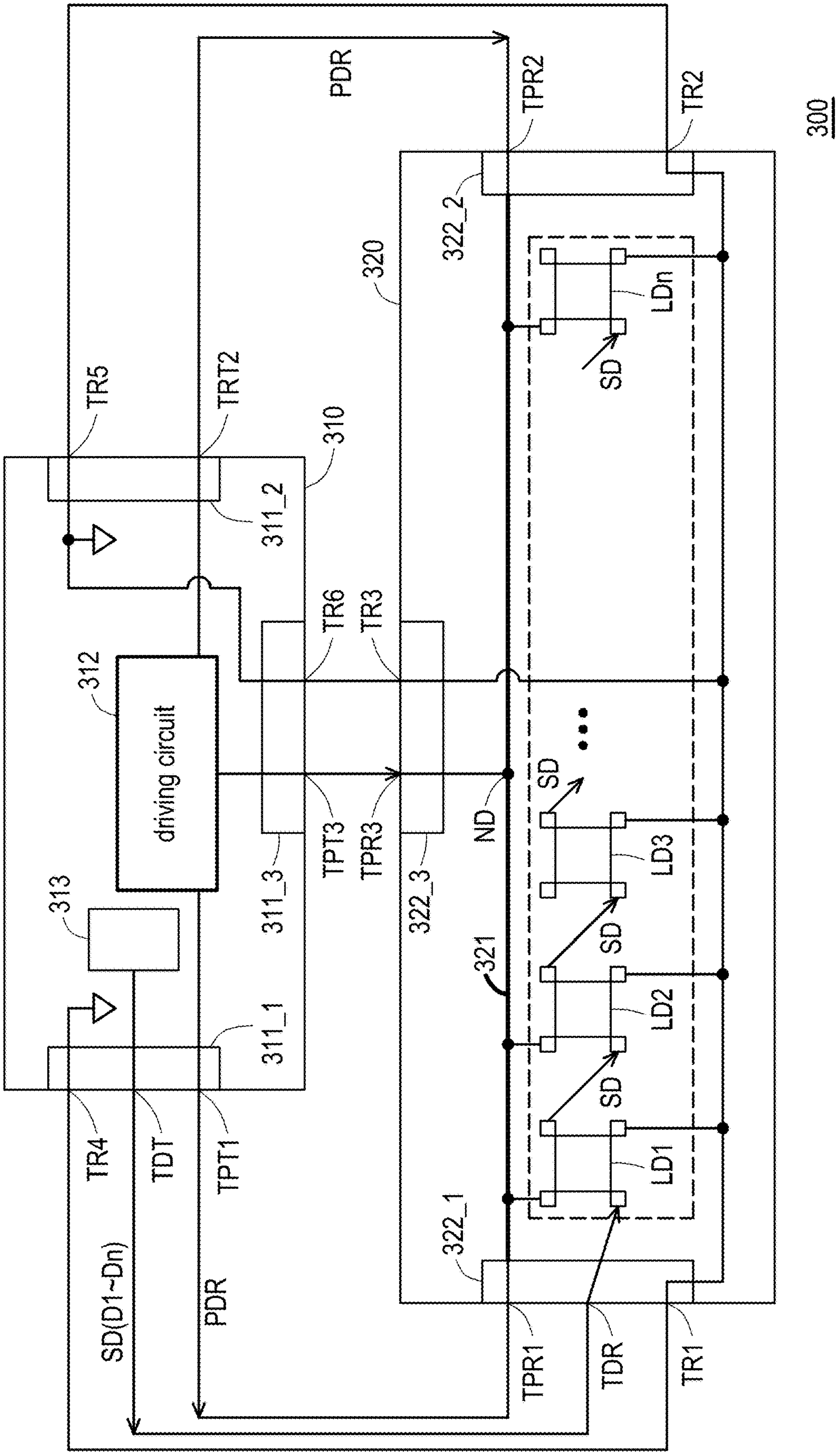
FIG. 5 is a schematic diagram illustrating a light emitting device according to an embodiment of the disclosure.

FIG. 5 is a schematic diagram illustrating a light emitting device according to an embodiment of the disclosure. In this embodiment, a control circuit 310 includes transmitting ports 311_1 to 311_3 and a driving circuit 312. The transmitting port 311_1 may be operated to connect to a receiving port 322_1. The transmitting port 311_2 may be operated to connect to a receiving port 322_2. The transmitting port 311_3 may be operated to connect to a receiving port 322_3. The driving circuit 312 is connected to the transmitting ports 311_1 to 311_3. The driving circuit 312 generates a driving power PDR and provides the driving power PDR to the transmitting ports 311_1 to 311_3. The driving power PDR is provided to the first terminal of a power line 321 through the transmitting port 311_1 and the receiving port 322_1. The driving power PDR is also provided to the second terminal of a power line 221 through the transmitting port 311_2 and the receiving port 322_2. Furthermore, the driving power PDR is also provided to a node ND of the power line 221 through the transmitting port 311_3 and the receiving port 322_3.

The control circuit 210 also includes a data generator 313. The data generator 313 is connected to the transmitting port 311_1. The data generator 313 generates a data string SD and provides the data string SD to the transmitting port 311_1. The data string SD is provided to the light emitting element LD1 through the transmitting port 311_1 and the receiving port 322_1.

In this embodiment, the transmitting port 311_1 includes a power transmitting terminal TPT1 and a data transmitting terminal TDT. The power transmitting terminal TPT1 is connected to the driving circuit 312. The data transmitting terminal TDT is connected to the data generator 313. When the transmitting port 311_1 is connected to the receiving port 322_1, the power transmitting terminal TPT1 is connected to a power receiving terminal TPR1. The data transmitting terminal TDT is connected to a data receiving terminal TDR. Therefore, the driving power PDR is provided to the first terminal of the power line 321 through the power transmitting terminal TPT1 and the power receiving terminal TPR1. The data string SD is provided to the light emitting element LD1 through the data transmitting terminal TDT and the data receiving terminal TDR.

In this embodiment, the transmitting port 311_2 includes a power transmitting terminal TPT2. The power transmitting terminal TPT2 is connected to the driving circuit 312. When the transmitting port 311_2 is connected to the receiving port 322_2, the power transmitting terminal TPT2 is connected to the power receiving terminal TPR2. Therefore, the driving power PDR is provided to the second terminal of the power line 321 through the power transmitting terminal TPT2 and the power receiving terminal TPR2. The transmitting port 311_3 includes a power transmitting terminal TPT3. The power transmitting terminal TPT3 is connected to the driving circuit 312. When the transmitting port 311_3 is connected to the receiving port 322_3, the power transmitting terminal TPT3 is connected to the power receiving terminal TPR3. Therefore, the driving power PDR is provided to the node ND of the power line 321 through the power transmitting terminal TPT3 and the power receiving terminal TPR3.

The transmitting port 311_1 also includes a reference terminal TR4. The transmitting port 311_2 also includes a reference terminal TR5. When the transmitting port 311_1 is connected to the receiving port 322_1, the transmitting port 311_2 is connected to the receiving port 322_2, and the transmitting port 311_3 is connected to the receiving port 322_3, the reference terminals TR1 to TR3 and the reference terminals of the light emitting elements LD1 to LDn are commonly connected to the reference low voltage in the control circuit 310 through the reference terminals TR4 to TR6.

In this embodiment, the transmitting ports 311_1 to 311_3 may be respectively implemented by connectors known to those skilled in the technical field.

In summary, the light emitting element string of the light emitting device includes multiple light emitting elements, a power line, and multiple receiving ports. The multiple receiving ports provide the driving power to both ends of the power line. The voltage values at both ends of the power line in the light emitting element string are consistent. As a result, the multiple light emitting elements can accurately execute the expected light emitting effect. Furthermore, in some embodiments, the multiple receiving ports provide the driving power to both ends of the power line and to the node between the two ends. Consequently, the voltage values at both ends of the power line and at the node in the light emitting element string are consistent.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A light emitting device, comprising:

a control circuit, configured to output a driving power; and a light emitting element string, comprising:

a plurality of light emitting elements, comprising a first-stage light emitting element located at a first terminal of the light emitting element string and a last-stage light emitting element located at a second terminal of the light emitting element string;

a power line, connected to the light emitting elements, wherein a first terminal of the power line is connected to the first-stage light emitting element, and a second terminal of the power line is connected to the last-stage light emitting element;

a first receiving port, connected to the control circuit, the first-stage light emitting element, and the first terminal of the power line; and a second receiving port, connected to the control circuit, the last-stage light emitting element, and the second terminal of the power line, wherein the first receiving port provides the driving power to the first terminal of the power line, and the second receiving port provides the driving power to the second terminal of the power line, so that voltage values at the first terminal of the power line and the second terminal of the power line are consistent.

2. The light emitting device according to claim 1, wherein the first receiving port comprises:

a first power receiving terminal, connected to the first terminal of the power line, configured to receive the driving power and transmit the driving power to the first terminal of the power line.

3. The light emitting device according to claim 2, wherein the first receiving port further comprises:

a data receiving terminal, connected to the first-stage light emitting element, configured to receive a data string and transmit the data string to the first-stage light emitting element.

4. The light emitting device according to claim 3, wherein the first-stage light emitting element receives a first data from the data string and transmits the data string to a second-stage light emitting element.

5. The light emitting device according to claim 4, wherein the second-stage light emitting element receives a second data from the data string and transmits the data string to a third-stage light emitting element.

6. The light emitting device according to claim 2, wherein the second receiving port comprises:

a second power receiving terminal, connected to the second terminal of the power line, configured to receive the driving power and transmit the driving power to the second terminal of the power line.

7. The light emitting device according to claim 1, wherein the control circuit comprises:

a first transmitting port, connected to the first receiving port;

a second transmitting port, connected to the second receiving port; and a driving circuit, connected to the first transmitting port and the second transmitting port, configured to generate the driving power and provide the driving power to the first transmitting port and the second transmitting port, wherein the driving power is provided to the first terminal of the power line through the first transmitting port and the first receiving port, and wherein the driving power is provided to the second terminal of the power line through the second transmitting port and the second receiving port.

8. The light emitting device according to claim 7, wherein the control circuit further comprises:

a data generator, connected to the first transmitting port, configured to generate a data string and provide the data string to the first transmitting port.

9. The light emitting device according to claim 7, wherein the light emitting elements further comprise:

a third receiving port, connected to the control circuit and the power line, configured to provide the driving power to a node of the power line, wherein the node of the power line is located between the first terminal of the power line and the second terminal of the power line.

10. The light emitting device according to claim 9, wherein the control circuit further comprises:

a third transmitting port, connected to the third receiving port, wherein the driving power is provided to the node of the power line through the third transmitting port and the third receiving port.

* * * * *